(12) United States Patent
Yamane

(10) Patent No.: US 6,276,231 B1
(45) Date of Patent: Aug. 21, 2001

(54) GRIP FOR A BICYCLE SHIFT CONTROL DEVICE

(75) Inventor: Takuro Yamane, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/599,970

(22) Filed: Jun. 21, 2000

Related U.S. Application Data

(62) Division of application No. 08/900,935, filed on Jul. 25, 1997, now Pat. No. 6,101,895.

(51) Int. Cl.$^7$ .............................. B62K 21/26; B62K 23/04
(52) U.S. Cl. ............................................ 74/551.9; 74/489
(58) Field of Search ........................... 74/551.9, 489, 74/488, 543; 16/116 R, DIG. 12; 81/177.1, 177.6; D8/303, DIG. 7, DIG. 8

(56) References Cited

U.S. PATENT DOCUMENTS

| | | | | |
|---|---|---|---|---|
| 2,222,121 | * | 11/1940 | Roberts | 74/551.9 |
| 3,189,069 | * | 6/1965 | Stowell | 145/61 |
| 3,344,684 | * | 10/1967 | Steere et al. | 74/551.9 |
| 3,633,437 | * | 1/1972 | Ishida | 74/489 |
| 4,768,406 | * | 9/1988 | Fitzwater | 81/177.1 |
| 4,900,291 | * | 2/1990 | Patterson | 474/80 |
| 4,969,231 | * | 11/1990 | Mader et al. | 16/141 R |
| 4,972,733 | * | 11/1990 | Olmr et al. | 74/551.9 |
| 5,197,927 | * | 3/1993 | Patterson et al. | 474/80 |
| 5,355,552 | | 10/1994 | Huang | 16/111 |
| 5,564,316 | * | 10/1996 | Larson et al. | 74/551.9 |
| 5,584,213 | * | 12/1996 | Larson et al. | 74/551.9 |

FOREIGN PATENT DOCUMENTS

| | | |
|---|---|---|
| 759393 A1 | 2/1997 | (EP) . |
| 44-26571 * | 11/1969 | (JP) . |
| 55-142142 * | 11/1980 | (JP) . |
| 55-142143 * | 11/1980 | (JP) . |
| 592659 * | 2/1978 | (SU) . |

\* cited by examiner

Primary Examiner—Mary Ann Green
(74) Attorney, Agent, or Firm—James A. Deland

(57) ABSTRACT

A rotatable handgrip for a twist-grip shift control device includes a rotatable member and a flexible grip disposed over the rotatable member. One or more spaces are defined between an inner peripheral surface of the grip and an outer peripheral surface of the rotatable member so that the grip bends radially inwardly in response to pressure from a hand part (palm, finger, thumb, etc.) so as to generally conform to the hand part. The space may be formed by a recess formed on the inner peripheral surface of the grip, on the outer peripheral surface of the rotatable member, a combination of recesses on the grip and the rotatable member, or through some other structure.

26 Claims, 5 Drawing Sheets

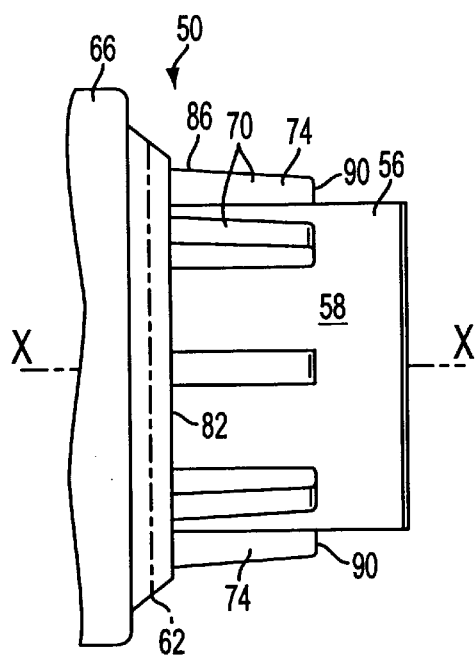
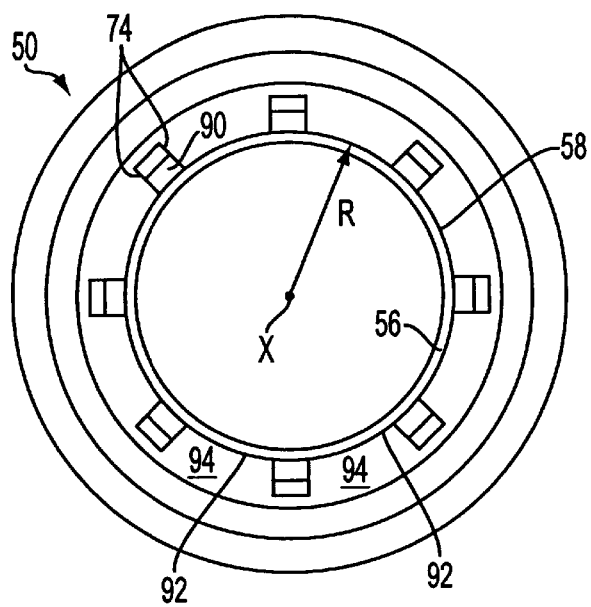
FIG. 2A
FIG. 2B
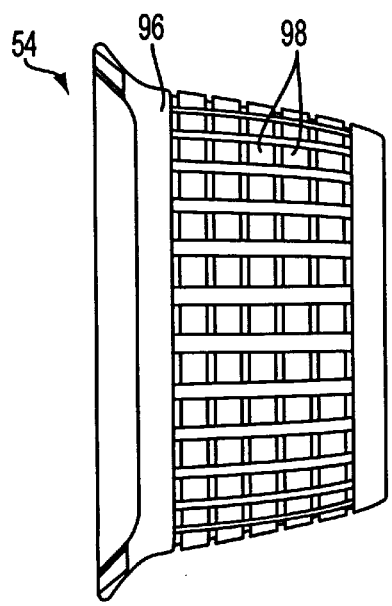
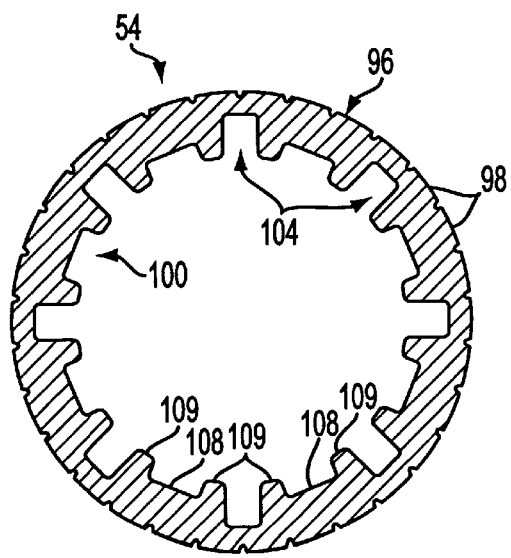
FIG. 3A
FIG. 3B

GRIP FOR A BICYCLE SHIFT CONTROL DEVICE

This application is a division of application Ser. No. 08/900,935, filed Jul. 25, 1997, now U.S. Pat. No. 6,101,895.

BACKGROUND OF THE INVENTION

The present invention is directed to bicycle shift control devices and, more particularly, to a grip for a twist-grip shift control device which conforms more closely to a rider's hand.

Twist-grip shift control devices are sometimes used to control various types of bicycle transmissions. Examples of such devices are disclosed in JP 44-26571; U.S. Pat. Nos. 3,633,437; 4,900,291 and 5,197,927. Such devices typically include a generally annular rotatable member that is mounted around the bicycle handlebar coaxially with the handlebar axis, wherein rotation of the rotatable member with the palm of the hand controls the pulling and releasing of the transmission control cable.

For reliable operation of twist-grip shift control devices, it is desirable to have adequate traction between the palm of the hand and the rotatable member. U.S. Pat. Nos. 5,564,316 and 5,584,213 discuss the use of nubs and elongated ribs on a flexible cover to increase the traction between the hand and the rotatable member. However, while such nubs and ribs may help improve traction, they also tend to jam into the rider's hand, thus creating pain and fatigue.

SUMMARY OF THE INVENTION

The present invention is directed to a rotatable member for a twist-grip shift control device wherein the grip portion of the rotatable member conforms closely to a rider's hand to increase traction between the palm of the hand and the rotatable member, but which significantly decreases the risk of pain and fatigue. In one embodiment of the present invention, a rotatable handgrip for a twist-grip shift control device includes a rotatable member and a flexible grip disposed over the rotatable member. One or more spaces are defined between an inner peripheral surface of the grip and an outer peripheral surface of the rotatable member so that the grip bends radially inwardly in response to pressure from a hand part (palm, finger, thumb, etc.) so as to generally conform to the hand part. The space may be formed by a recess formed on the inner peripheral surface of the grip, on the outer peripheral surface of the rotatable member, a combination of recesses on the grip and the rotatable member, or through some other means. A rotatable grip constructed according to the present invention increases traction between the palm of the hand and the rotatable grip without requiring ribs or nubs. However, the present invention also may be employed advantageously in a handgrip which uses ribs and nubs, because the space between the grip and the rotatable member allow the ribs and nubs to yield to the pressure of the rider's hand. This, in turn, reduces or eliminates the incidences of pain and fatigue.

BRIEF DESCRIPTION OF THE DRAWINGS

FIGS. 2A and 2B are front and side views, respectively, of a particular embodiment of a rotatable member according to the present invention used in the twist-grip shift control device of FIG. 1;

FIGS. 3A and 3B are front and side views, respectively, of a particular embodiment of a flexible grip according to the present invention that is used with the rotatable member shown in FIGS. 2A and 2B;

DETAILED DESCRIPTION OF THE EMBODIMENTS

Figure 1:
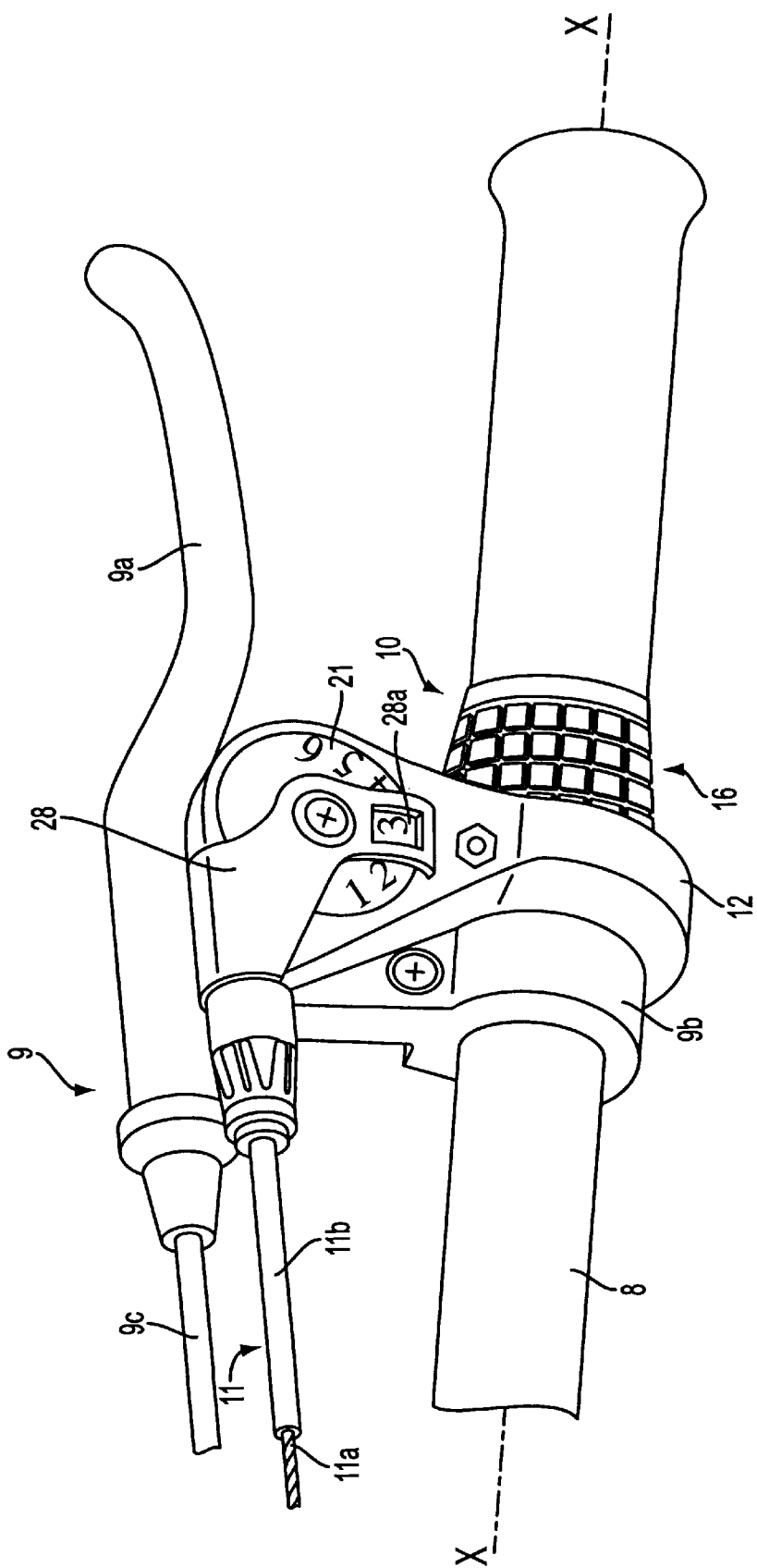
FIG. 1 is an oblique view of a particular embodiment of a bicycle twist-grip shift control device according to the present invention mounted together with a brake lever assembly.

FIG. 1 is an oblique view of a particular embodiment of a twist-grip shift control device 10 according to the present invention mounted together with a brake lever assembly 9. As shown in FIG. 1, shift control device 10 includes a housing 12 mounted around a handlebar 8, a rotatable handgrip 16 structured for rotation around an axis X coaxial with handlebar 8, a pulley 21 for pulling and releasing an inner wire 11a that slides within an outer casing 11b of control cable 11, and a pulley retaining member 28 for retaining pulley 21 to housing 12. Pulley retaining member 28 may include a framed opening 28a for selectively displaying a numeral disposed on pulley 21 indicating the currently selected gear. A motion transmitting mechanism (not shown) is disposed between rotatable handgrip 16 and pulley 21 for transmitting rotation of handgrip 16 to pulley 21. The motion transmitting mechanism may be constructed, for example, according to U.S. Pat. No. 5,921,139 entitled "Bicycle Shift Control Device" by Takuro Yamane and incorporated herein by reference. Since the motion transmitting mechanism does not form a part of the present invention, a detailed description of that mechanism shall be omitted.

Brake lever assembly 9 includes a brake lever 9a pivotably mounted to a brake lever bracket 9b which, in turn, is mounted around handlebar 8 in close proximity to (e.g., adjacent) housing 12 of shift control device 10. Brake lever 9a is connected to a brake control cable 9c for controlling a brake device in a conventional manner.

As shown in FIGS. 2A, 2B, 3A, 3B and 4, handgrip 16 includes a rotatable member 50 and a flexible grip 54. As shown in FIGS. 2A and 2B, rotatable member 50 includes a generally cylindrical main body 56 having an outer peripheral surface 58; a generally frustoconical intermediate portion 62, and a larger generally cylindrical portion 66 which interfaces with the motion transmitting mechanism within housing 12. A plurality of grip engaging members in the form of ribs 70 elongated in the direction of the handlebar axis X extend radially outwardly from outer peripheral surface 58 of main body 56. In this embodiment, ribs 70 are evenly spaced in the circumferential direction of outer peripheral surface 58. Each rib includes a pair of side surfaces 74 that extend from a side surface 82 of frustoconical portion 62 in the direction of the handlebar axis X, and a top surface 86 that inclines slightly radially inwardly from side surface 82 of frustoconical portion 62 to a rib end surface 90 located at an intermediate portion of outer peripheral surface 58. The plurality of ribs 70 define a corresponding plurality of valleys 94 disposed between each pair of adjacent ribs 70, where the bottom floor 92 of each valley 94 is formed by outer peripheral surface 58 of main body 56. In this embodiment, outer peripheral surface 58 has a constant radius of curvature R from handlebar axis X along its entire axial length so that outer peripheral surface 58 has the shape of a straight cylinder. As a result, the floor 92 of each valley 94 likewise has a constant radius of curvature as shown in FIG. 2B.

Figure 4:
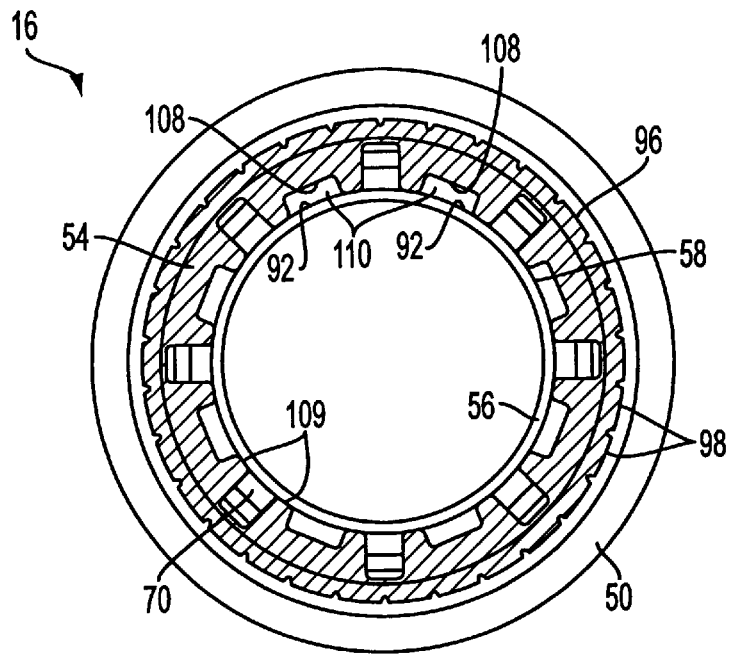
FIG. 4 is a side cross sectional view illustrating the flexible grip shown in FIGS. 3A and 3B installed on the rotatable member shown in FIGS. 2A and 2B.

As shown in FIGS. 3A, 3B, and 4, flexible grip 54 snugly fits around outer peripheral surface 58 of rotatable member 50, and an outer peripheral surface 96 of grip 54 includes a plurality of gripping projections 98 to further facilitate traction between the rider's hand and grip 54 (and hence) rotatable handgrip 16. The inner peripheral surface 100 of grip 54 includes a plurality of rotatable member engaging recesses 104 that are evenly spaced in the circumferential direction of inner peripheral surface 100. Each rotatable member engaging recess 104 is shaped for snugly fitting to a corresponding rib 70 so that grip 54 is nonrotatably secured to rotatable member 50. A plurality of recesses 108 disposed between spaced apart pairs of inner peripheral surface portions 109 likewise are evenly spaced along the inner peripheral surface of grip 54. Each recesses 108 cooperates with a corresponding valley floor 92 for forming a plurality of spaces 110 as shown in FIG. 4. Inner peripheral surface portions 109 are disposed adjacent to their corresponding ribs 70 and contact both the rib 70 and the adjacent valley floor 92 to snugly fit grip 54 to rotatable member 50.

Figure 5:
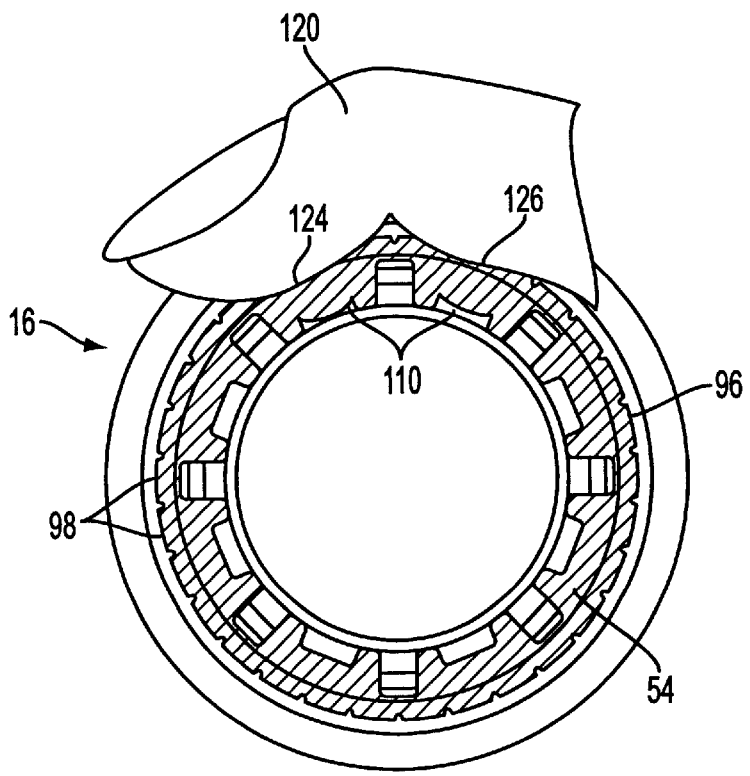
FIG. 5 is a side cross sectional view of the rotatable member and flexible grip illustrating how the flexible grip bends in response to a gripping force exerted by a hand.

FIG. 5 is a side cross sectional view of the rotatable member 50 and flexible grip 54 illustrating how the flexible grip 54 bends in response to a gripping force exerted by a hand. As shown in FIG. 5, a finger 120 presses radially inwardly to firmly grasp rotatable grip 16. Because of the flexibility of grip 54, the portions of grip 54 disposed over spaces 110 form first and second dents 124 and 126 which conform to finger 120 in response to the radially inwardly directed pressure of finger 120. When further pressure is applied by finger 120, the portions of grip 54 disposed over spaces 110 bend radially inwardly as shown in FIG. 5 for partially or substantially reducing the volume of the corresponding space 110. Because of this yielding nature of grip 54, dents 124 and 126 enhance the traction between the rider's hand and rotatable handgrip 16 by conforming more closely to the rider's hand. Also, there are no sharp edges jamming into the rider's hand as in the prior art rib/nub designs. Furthermore, the yielding nature of grip 54 also cushions the rider's hand to avoid the excessive pressures caused by prior art rib/nub designs, thus further reducing the risk of pain or fatigue.

Figure 6:
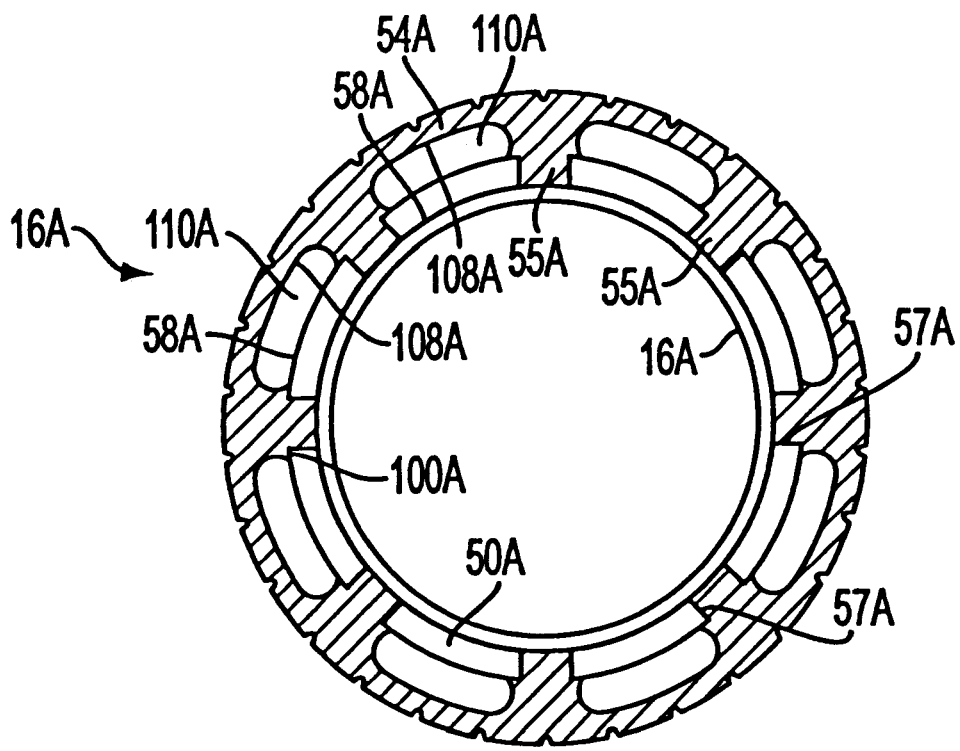
FIG. 6 is a side cross sectional view of an alternative embodiment of a rotatable member and flexible grip according to the present invention.

FIG. 6 is a side cross sectional view of an alternative embodiment of a rotatable handgrip 16A according to the present invention using a different rotatable member 50A and flexible grip 54A. In this embodiment, grip 54A includes a plurality of rotatable member engaging members 55A projecting radially inwardly from the inner peripheral surface 100A. Rotatable member 50A includes a plurality of grip engaging recesses 57A formed in outer peripheral surface 58A, wherein each rotatable member engaging member 55A is disposed in a corresponding grip engaging recess 57A. A plurality of recesses 108A disposed between adjacent pairs of rotatable member engaging members 55A are evenly spaced along the inner peripheral surface 100A of grip 54A. Each recess 108A cooperates with a corresponding portion of the outer peripheral surface 58A of rotatable member 50A for forming a plurality of spaces 100A that function in the same manner as spaces 110 in the first embodiment.

Figure 7:
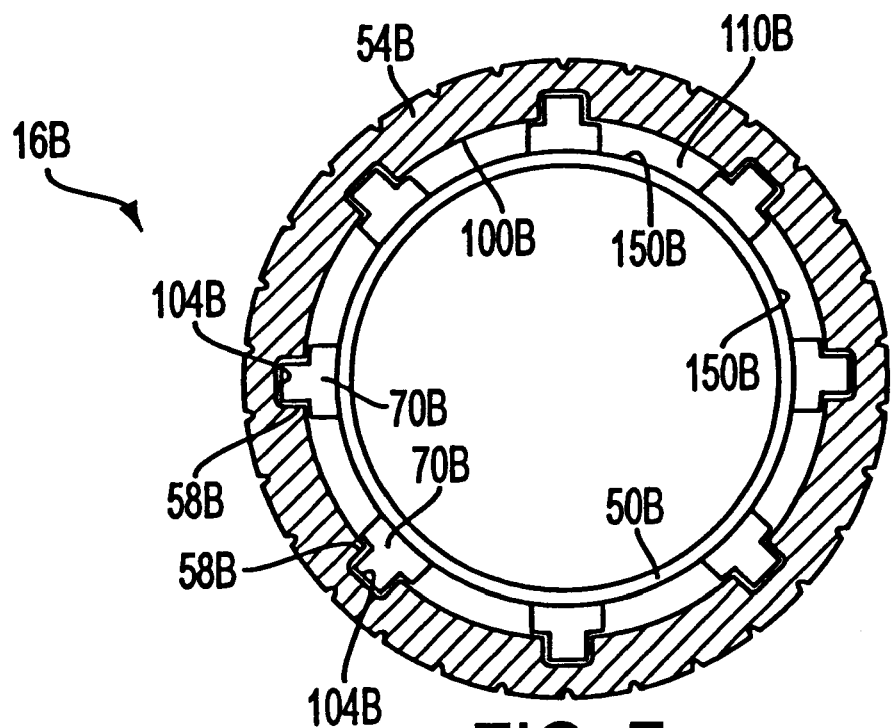
FIG. 7 is a side cross sectional view of another alternative embodiment of a rotatable member and flexible grip according to the present invention.

FIG. 7 is a side cross sectional view of another alternative embodiment of a rotatable handgrip 16B according to the present invention using a different rotatable member 50B and flexible grip 54B. As in the first embodiment, the rotatable member 50B includes a plurality of grip engaging members in the form of ribs 70B projecting radially outwardly from the outer peripheral surface 58B, the grip 54B includes a corresponding plurality of rotatable member engaging recess 104B, and each grip engaging member 70B is disposed in a corresponding rotatable member engaging recess 104B. However, in this embodiment, grip 54B does not have recesses corresponding to recesses 108 in the first embodiment. Instead, a plurality of evenly spaced recesses 150 are formed in the outer peripheral surface 58B of rotatable member 50B. Each recess 150 cooperates with the inner peripheral surface 100B of grip 54B for forming a plurality of spaces 110B that function in the same manner as spaces 110 in the first embodiment.

Figure 8:
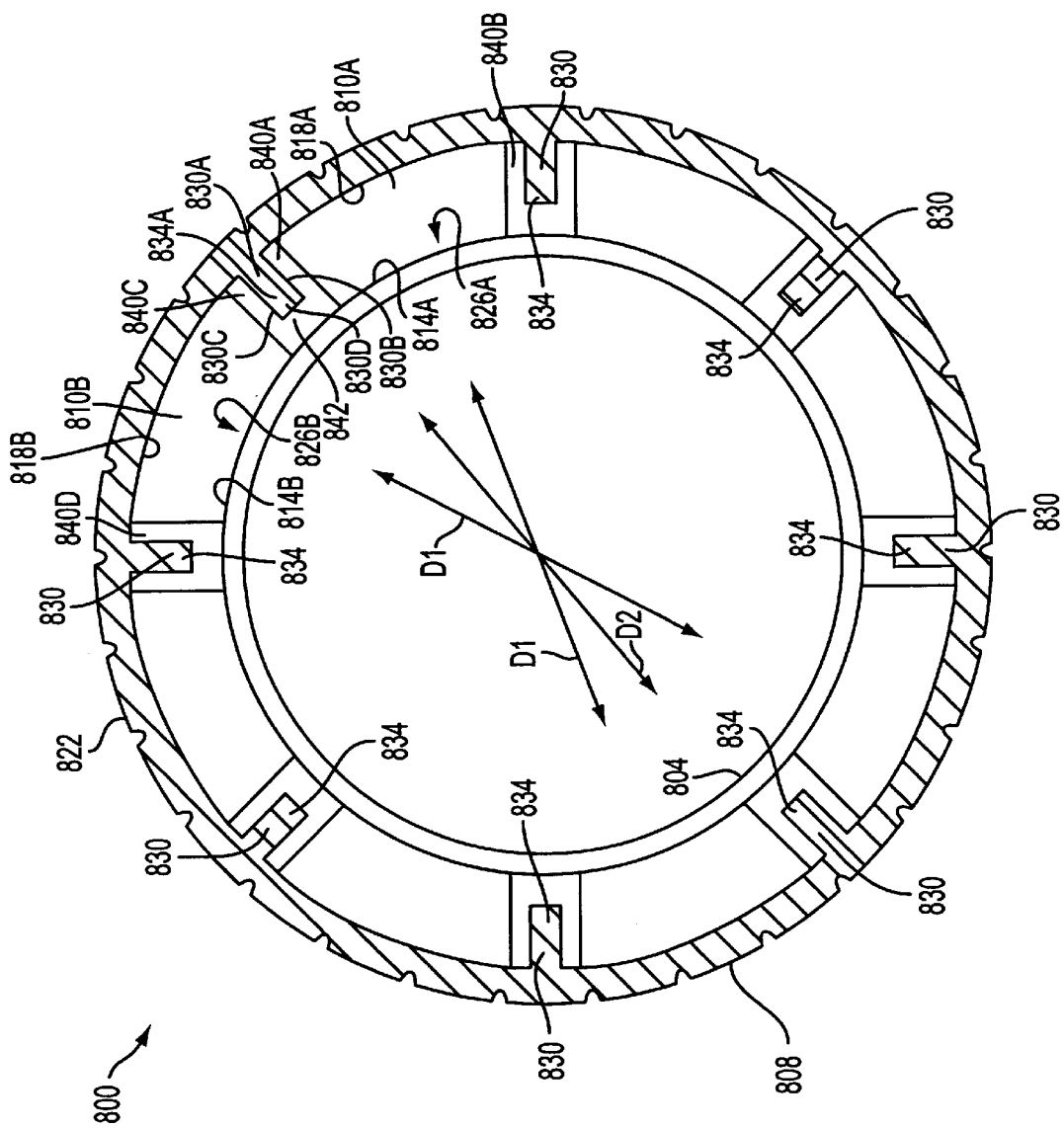
FIG. 8 is a side cross sectional view of another alternative embodiment of a rotatable member and flexible grip according to the present invention.

FIG. 8 is a side cross sectional view of an alternative embodiment of a rotatable handgrip 800 according to the present invention using a different rotatable member 804 and flexible grip 808. In this embodiment, a first space 810A is defined between an outer peripheral surface 814A of the rotatable member 804 and an inner peripheral surface 818A of the grip 808 so that the grip 808 bends radially inwardly into the first space 810A to form a first dent (not shown, but similar to dent 126 in FIG. 5) in the outer peripheral surface 822 of the grip in response to pressure from a hand part. A first space-forming recess 826A is formed on the outer peripheral surface 814A of the rotatable member 804 for forming the first space 810A. A second space 810B is defined between an outer peripheral surface 814B of the rotatable member 804 and an inner peripheral surface 818B of the grip 808 so that the grip 808 bends radially inwardly into the second space 810B to form a second dent (not shown, but similar to dent 124 in FIG. 5) in the outer peripheral surface 822 of the grip in response to pressure from the hand part. A second space-forming recess 826B is formed on the outer peripheral surface 814B of the rotatable member 804 for forming the second space 810B.

In general, grip 808 includes a plurality of circumferentially evenly spaced elongated rotatable member engaging members or ribs 830 that engage a corresponding plurality of circumferentially evenly spaced grip engaging recesses 834 to form a plurality of the first spaces 810A and second spaces 810B. For example, the grip 808 includes a rotatable member engaging member 830A projecting radially inwardly from the inner peripheral surfaces 818A and 818B of grip 808, and the rotatable member 804 includes a grip engaging recess 834A, wherein the rotatable member engaging member 830A is disposed in the grip engaging recess 834A, and wherein the rotatable member engaging member 830A is disposed circumferentially between the first space-forming recess 826A and the second space-forming recess 826B. The circumferential width W1 of the grip engaging recess 834A is less than a corresponding circumferential width of the first space-forming recess 826A.

The first space-forming recess 826A is formed between first and second rotatable member projections or sidewalls 840A and 840B extending radially outwardly and forming an extension of the outer peripheral surface 814A of the rotatable member 804. First and second rotatable member sidewalls 840A and 840B face each other in the circumferential direction, and the first rotatable member sidewall 840A and the second rotatable member sidewall 840B, including radially outermost portions thereof, are disposed clockwise of a first sidewall 830B of the rotatable member engaging member 830A so that the entire first space-forming recess 826A is disposed clockwise of the first sidewall 830B of the rotatable member engaging member 830A. The entire outer peripheral surface 814A of the rotatable member 804 between the first rotatable member sidewall 840A and the second rotatable member sidewall 840B is spaced apart from the inner peripheral surface 818A of grip 808.

Similarly, the second space-forming recess 826B is formed between third and fourth rotatable member projections or sidewalls 840C and 840D extending radially outwardly and forming an extension of the outer peripheral surface 814B of rotatable member 804. Third and fourth rotatable member sidewalls 840C and 840D face each other in the circumferential direction, and the third rotatable member sidewall 840C and the fourth rotatable member sidewall 840D, including radially outermost portions thereof, are disposed counterclockwise of a second sidewall 830C of the rotatable member engaging member 830A so that the entire second space-forming recess 826B is disposed counterclockwise of the second sidewall 830C of the rotatable member engaging member 830A. The entire outer peripheral surface 814B of the rotatable member 804 between the third rotatable member sidewall 840C and the fourth rotatable member sidewall 840D is spaced apart from the inner peripheral surface 818B of grip 808.

Each of the plurality of grip engaging recesses has a radially innermost circumferential outer surface or bottom wall, such as bottom wall 842 that is flat along its entire circumferential width. As shown for rotatable member engaging member 830A, as well as the other rotatable member engaging members 830, each first and second sidewall 830B and 830C and a radially innermost surface or bottom wall 830D of rotatable member engaging member 830A contacts its facing first rotatable member sidewall 840A, third rotatable member sidewall 840C and bottom wall 842. A diameter D1 of an outer peripheral surface 822 of the grip 808 above a circumferential midpoint of the first and second space-forming recess 810A and 810B has a same value as a diameter D2 of the outer peripheral surface 822 of the grip 808 above a circumferential midpoint of the rotatable member engaging member 830A. The same is true for the other space forming recesses and rotatable member engaging members.

While the above is a description of various embodiments of the present invention, further modifications may be employed without departing from the spirit and scope of the present invention. For example, the size, orientation, location and shape of the various components may be changed as desired. Material may be added or removed from the parts as well. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A rotatable handgrip for a bicycle shifter comprising:
   a rotatable member;
   a flexible grip disposed over the rotatable member;
   wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
   wherein a first space-forming recess is formed on the outer peripheral surface of the rotatable member for forming the first space;
   wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
   wherein a second space-forming recess is formed on the outer peripheral surface of the rotatable member for forming the second space;
   wherein the grip includes a rotatable member engaging member projecting radially inwardly from the inner peripheral surface;
   wherein the rotatable member includes a grip engaging recess;
   wherein a circumferential width of the grip engaging recess is less than a corresponding circumferential width of the first space-forming recess;
   wherein the rotatable member engaging member is disposed in the grip engaging recess;
   wherein the rotatable member engaging member is disposed circumferentially between the first space-forming recess and the second space-forming recess;
   wherein the first space-forming recess is formed by a first rotatable member sidewall facing a second rotatable member sidewall in a circumferential direction; and
   wherein the first rotatable member sidewall and the second rotatable member sidewall are disposed clockwise of a first sidewall of the rotatable member engaging member.

2. The handgrip according to claim 1 wherein substantially all of the rotatable member engaging member contacts the grip engaging recess.

3. The handgrip according to claim 1 wherein radially outermost portions of the first rotatable member sidewall and the second rotatable member sidewall are disposed clockwise of the first sidewall of the rotatable member engaging member.

4. The handgrip according to claim 3 wherein the entire first space-forming recess is disposed clockwise of the first sidewall of the rotatable member engaging member.

5. The handgrip according to claim 1 wherein the second space-forming recess is formed by a third rotatable member sidewall facing a fourth rotatable member sidewall in a circumferential direction, and wherein the third rotatable member sidewall and the fourth rotatable member sidewall are disposed counterclockwise of a second sidewall of the rotatable member engaging member.

6. The handgrip according to claim 5 wherein the grip engaging recess has a radially innermost circumferential outer surface that is flat along its entire circumferential width.

7. The handgrip according to claim 5 wherein radially outermost portions of the first rotatable member sidewall and the second rotatable member sidewall are disposed clockwise of the first sidewall of the rotatable member engaging member, and wherein radially outermost portions of the third rotatable member sidewall and the fourth rotatable member sidewall are disposed counterclockwise of the second sidewall of the rotatable member engaging member.

8. The handgrip according to claim 7 wherein the entire first space-forming recess is deposed clockwise of the first sidewall of the rotatable member engaging member, and wherein the entire second space-forming recess is disposed counterclockwise of the second sidewall of the rotatable member engaging member.

9. The handgrip according to claim 5 wherein the rotatable member includes:
   a plurality of the first-space forming recesses;
   a plurality of the second space forming recesses; and
   a plurality of the grip engaging recesses;
   wherein the grip includes a plurality of elongated ribs forming a plurality of the rotatable member engaging members; and
   wherein each of the plurality of ribs is disposed in a corresponding one of the plurality of grip engaging recesses.

10. The handgrip according to claim 9 wherein the plurality of ribs are disposed evenly in a circumferential direction along the inner peripheral surface of the grip.

11. The handgrip according to claim 10 wherein the plurality of first-space forming recesses and the plurality of second space-forming recesses are disposed evenly in the circumferential direction along the outer peripheral surface of the rotatable member.

12. A rotatable handgrip for a bicycle shifter comprising:
   a rotatable member;
   a flexible grip disposed over the rotatable member;
   wherein a plurality of first spaces are defined between an inner peripheral surface of the grip and an outer peripheral surface of the rotatable member so that the grip bends radially inwardly into at least one of the plurality of first spaces to form a first dent in an outer peripheral surface of the grip in response to pressure from a hand part;
   wherein a plurality of first space-forming recesses are formed on the outer peripheral surface of the rotatable member for forming the plurality of first spaces;
   wherein a plurality of second spaces are defined between an inner peripheral surface of the grip and an outer peripheral surface of the rotatable member so that the grip bends radially inwardly into at least one of the plurality of second spaces to form a second dent in the outer peripheral surface of the grip in response to pressure from the hand part;
   wherein a plurality of second space-forming recesses are formed on the outer peripheral surface of the rotatable member for forming the plurality of second spaces;
   wherein the grip includes a plurality of ribs projecting radially inwardly from the inner peripheral surface;
   wherein the rotatable member includes a plurality of grip engaging recesses;
   wherein each of the plurality of ribs is disposed in a corresponding one of the plurality of grip engaging recesses;
   wherein each rib is disposed circumferentially between one of the plurality of first space-forming recesses and one of the plurality of second space-forming recesses;
   wherein each first space-forming recess is formed by a first rotatable member sidewall facing a second rotatable member sidewall in a circumferential direction;
   wherein the first rotatable member sidewall and the second rotatable member sidewall are disposed clockwise of a first sidewall of an adjacent rib;
   wherein each second space-forming recess is formed by a third rotatable member sidewall facing a fourth rotatable member sidewall in a circumferential direction;
   wherein the third rotatable member sidewall and the fourth rotatable member sidewall are disposed counterclockwise of a second sidewall of the adjacent rib; and
   wherein only one of the plurality of first space-forming recesses or second space-forming recesses is disposed between each adjacent pair of the plurality of ribs.

13. The handgrip according to claim 12 wherein each of the plurality of grip engaging recesses has a radially innermost circumferential outer surface that is flat along its entire circumferential width.

14. A rotatable handgrip for a bicycle shifter comprising:
   a rotatable member;
   a flexible grip disposed over the rotatable member;
   wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
   wherein a first space-forming recess is formed on the outer peripheral surface of the rotatable member for forming the first space;
   wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
   wherein a second space-forming recess is formed on the outer peripheral surface of the rotatable member for forming the second space;
   wherein the grip includes a rotatable member engaging member projecting radially inwardly from the inner peripheral surface;
   wherein the rotatable member includes a grip engaging recess;
   wherein a circumferential width of the grip engaging recess is less than a corresponding circumferential width of the first space-forming recess;
   wherein the rotatable member engaging member is disposed in the grip engaging recess; and
   wherein the grip engaging recess has a radially innermost circumferential outer surface that is flat along its entire circumferential width.

15. The hand grip according to claim 14 wherein substantially all of the rotatable member engaging member contacts the grip engaging recess.

16. The handgrip according to claim 14 wherein the rotatable member includes:
   a plurality of the first-space forming recesses;
   a plurality of the second space forming recesses; and
   a plurality of the grip engaging recesses;
   wherein the grip includes a plurality of elongated ribs forming a plurality of the rotatable member engaging members; and
   wherein each of the plurality of ribs is disposed in a corresponding one of the plurality of grip engaging recesses.

17. The handgrip according to claim 16 wherein the plurality of ribs are disposed evenly in a circumferential direction along the inner peripheral surface of the grip.

18. The handgrip according to claim 17 wherein the plurality of first-space forming recesses and the plurality of second space-forming recesses are disposed evenly in the circumferential direction along the outer peripheral surface of the rotatable member.

19. A rotatable handgrip for a bicycle shifter comprising:
a rotatable member;
a flexible grip disposed over the rotatable member;
wherein a plurality of first spaces are defined between an inner peripheral surface of the grip and an outer peripheral surface of the rotatable member so that the grip bends radially inwardly into at least one of the plurality of first spaces to form a first dent in an outer peripheral surface of the grip in response to pressure from a hand part;
wherein a plurality of first space-forming recesses are formed on the outer peripheral surface of the rotatable member for forming the plurality of first spaces;
wherein a plurality of second spaces are defined between an inner peripheral surface of the grip and an outer peripheral surface of the rotatable member so that the grip bends radially inwardly into at least one of the plurality of second spaces to form a second dent in the outer peripheral surface of the grip in response to pressure from the hand part;
wherein a plurality of second space-forming recesses are formed on the outer peripheral surface of the rotatable member for forming the plurality of second spaces;
wherein the grip includes a plurality of ribs projecting radially inwardly from the inner peripheral surface;
wherein the rotatable member includes a plurality of grip engaging recesses;
wherein each of the plurality of ribs is disposed in a corresponding one of the plurality of grip engaging recesses;
wherein the grip engaging recess has a radially innermost circumferential outer surface that is flat along its entire circumferential width; and
wherein only one of the plurality of first space-forming recesses or second space-forming recesses is disposed between each adjacent pair of the plurality of ribs.

20. A rotatable handgrip for a bicycle shifter comprising:
a rotatable member;
a flexible grip disposed over the rotatable member;
wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
wherein a first space-forming recess is formed on the outer peripheral surface of the rotatable member for forming the first space;
wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
wherein a second space-forming recess is formed on the outer peripheral surface of the rotatable member for forming the second space;
wherein the grip includes a rotatable member engaging member projecting radially inwardly from the inner peripheral surface of the grip;
wherein the rotatable member includes a grip engaging recess;
wherein a circumferential width of the grip engaging recess is less than a corresponding circumferential width of the first space-forming recess;
wherein the rotatable member engaging member is disposed in the grip engaging recess;
wherein the first space-forming recess is formed between first and second rotatable member projections extending radially outwardly from the outer peripheral surface of the rotatable member;
wherein the first and second rotatable member projections are disposed clockwise of a first sidewall of the rotatable member engaging member;
wherein the second space-forming recess is formed between third and fourth rotatable member projections extending radially outwardly from the outer peripheral surface of the rotatable member;
wherein the third and fourth rotatable member projections are disposed counterclockwise of a second sidewall of the rotatable member engaging member; and
wherein a diameter of an outer peripheral surface of the grip above the first space-forming recess and the second space-forming recess has a same value as a diameter of the outer peripheral surface of the grip above the rotatable member engaging member.

21. The handgrip according to claim 20 wherein substantially all of the rotatable member engaging member contacts the grip engaging recess.

22. The handgrip according to claim 20 wherein the entire first space-forming recess is disposed clockwise of the first sidewall of the rotatable member engaging member, and wherein the entire second space-forming recess is disposed counterclockwise of the second sidewall of the rotatable member engaging member.

23. The handgrip according to claim 20 wherein the rotatable member includes:
a plurality of the first-space forming recesses;
a plurality of the second space forming recesses; and
a plurality of the grip engaging recesses;
wherein the grip includes a plurality of elongated ribs forming a plurality of the rotatable member engaging members; and
wherein each of the plurality of ribs is disposed in a corresponding one of the plurality of grip engaging recesses;
wherein each of the plurality of ribs is disposed between only one of the plurality of first space-forming recess and only one of the plurality of second space-forming recesses; and
wherein a diameter of an outer peripheral surface of the grip above each first space-forming recess and each second space-forming recess has a same value as a diameter of the outer peripheral surface of the grip above the rib between them.

24. The handgrip according to claim 23 wherein the plurality of ribs are disposed evenly in a circumferential direction along the inner peripheral surface of the grip.

25. The handgrip according to claim 24 wherein the plurality of first-space forming recesses and the plurality of second space-forming recesses are disposed evenly in the circumferential direction along the outer peripheral surface of the rotatable member.

26. A rotatable handgrip for a bicycle shifter comprising:

a rotatable member;

a flexible grip disposed over the rotatable member;

wherein a plurality of first spaces are defined between an inner peripheral surface of the grip and an outer peripheral surface of the rotatable member so that the grip bends radially inwardly into at least one of the plurality of first spaces to form a first dent in an outer peripheral surface of the grip in response to pressure from a hand part;

wherein a plurality of first space-forming recesses are formed on the outer peripheral surface of the rotatable member for forming the plurality of first spaces;

wherein a plurality of second spaces are defined between an inner peripheral surface of the grip and an outer peripheral surface of the rotatable member so that the grip bends radially inwardly into at least one of the plurality of second spaces to form a second dent in the outer peripheral surface of the grip in response to pressure from the hand part;

wherein a plurality of second space-forming recesses are formed on the outer peripheral surface of the rotatable member for forming the plurality of second spaces;

wherein the grip includes a plurality of ribs projecting radially inwardly from the inner peripheral surface;

wherein the rotatable member includes a plurality of grip engaging recesses;

wherein each of the plurality of ribs is disposed in a corresponding one of the plurality of grip engaging recesses;

wherein each first space-forming recess is formed between first and second rotatable member projections extending radially outwardly from the outer peripheral surface of the rotatable member;

wherein the first and second rotatable member projections are disposed clockwise of a first sidewall of a selected one of the plurality of ribs;

wherein each second space-forming recess is formed between third and fourth rotatable member projections extending radially outwardly from the outer surface of the rotatable member;

wherein the third and fourth rotatable member projections are disposed counterclockwise of a second sidewall of the selected one of the plurality of ribs; and wherein a diameter of an outer peripheral surface of the grip above each first space-forming recess and each second space-forming recess has a same value as a diameter of the outer peripheral surface of the grip above the rib between them; and wherein only one of the plurality of first space-forming recesses or second space forming recesses is disposed between each adjacent pair of the plurality of ribs.

* * * * *